(12) United States Patent
Jacob et al.

(10) Patent No.: US 11,425,797 B2
(45) Date of Patent: Aug. 23, 2022

(54) AIR DATA PROBE INCLUDING SELF-REGULATING THIN FILM HEATER

(71) Applicant: Rosemount Aerospace Inc., Burnsville, MN (US)

(72) Inventors: Robin Jacob, Bangalore (IN); Guru Prasad Mahapatra, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 308 days.

(21) Appl. No.: 16/736,953

(22) Filed: Jan. 8, 2020

(65) Prior Publication Data
US 2021/0127458 A1    Apr. 29, 2021

(30) Foreign Application Priority Data

Oct. 29, 2019 (IN) .............................. 201911043806

(51) Int. Cl.
*G01P 5/165* (2006.01)
*H05B 3/46* (2006.01)

(52) U.S. Cl.
CPC ............... *H05B 3/46* (2013.01); *G01P 5/165* (2013.01)

(58) Field of Classification Search
None
See application file for complete search history.

(56) References Cited

U.S. PATENT DOCUMENTS

| | | | |
|---|---|---|---|
| 4,458,137 A | 7/1984 | Kirkpatrick | |
| 4,801,784 A | 1/1989 | Jensen et al. | |
| 5,421,202 A | 6/1995 | Le Pimpec | |
| 6,134,972 A * | 10/2000 | Streckert | C23C 14/046 73/861.65 |
| 6,492,629 B1 | 12/2002 | Sopory | |
| 6,591,696 B2 * | 7/2003 | Bachinski | G01P 5/165 73/747 |
| 8,164,035 B2 | 4/2012 | Chang | |
| 8,367,986 B2 | 2/2013 | Von Wachenfeldt et al. | |
| 8,466,392 B2 | 6/2013 | O'Connor | |
| 8,481,898 B2 | 7/2013 | Parker | |
| 8,496,854 B2 | 7/2013 | Mercx et al. | |
| 8,525,084 B2 | 9/2013 | O'Connor | |

(Continued)

FOREIGN PATENT DOCUMENTS

| | | | | |
|---|---|---|---|---|
| EP | 3264103 A1 | 1/2018 | | |
| EP | 3321692 A1 | 5/2018 | | |
| EP | 3668270 A1 * | 6/2020 | ............. | B64D 15/12 |

OTHER PUBLICATIONS

Chu et al. "Electrical and Thermal Properties of Carbon-Nanotube Composite for Flexible Electric Heating-Unit Applications" IEEE Electron Device Letters vol. 34 No. 5 (May 2013) pp. 668-670.

(Continued)

*Primary Examiner* — Harshad R Patel
(74) *Attorney, Agent, or Firm* — Cantor Colburn LLP

(57) ABSTRACT

An air date probe includes a strut assembly extending from a base, and a tube assembly coupled to the strut assembly. One or both of the strut assembly and the tube assembly comprises a self-regulating thin film heating arrangement. The self-regulating thin film heating arrangement includes at least one circuit including a positive temperature coefficient (PTC) heating element connected in series with a negative temperature coefficient (NTC) heating element.

20 Claims, 6 Drawing Sheets

(56) References Cited

U.S. PATENT DOCUMENTS

| | | |
|---|---|---|
| 8,952,300 B2 | 2/2015 | Malone et al. |
| 9,511,871 B2 | 12/2016 | Steinwandel et al. |
| 9,668,301 B2 | 5/2017 | Lim et al. |
| 9,693,394 B2 | 6/2017 | Sweeney et al. |
| 9,955,531 B2 | 4/2018 | Kang et al. |
| 10,197,588 B2 | 2/2019 | Wong et al. |
| 10,368,394 B2 | 7/2019 | Shearer et al. |
| 2009/0194525 A1 | 8/2009 | Lee et al. |
| 2010/0059502 A1 | 3/2010 | O'Connor |
| 2010/0102052 A1 | 4/2010 | Boardman |
| 2010/0116806 A1 | 5/2010 | Hollingsworth et al. |
| 2011/0297665 A1 | 12/2011 | Parker |
| 2016/0113063 A1 | 4/2016 | O'Connor et al. |
| 2016/0221680 A1 | 8/2016 | Burton et al. |
| 2017/0158898 A1 | 6/2017 | Xiao et al. |
| 2018/0124874 A1 | 5/2018 | Dardona et al. |
| 2018/0160482 A1 | 6/2018 | Hartzler et al. |
| 2020/0086999 A1* | 3/2020 | Jacob ............... H05B 3/34 |
| 2020/0189751 A1* | 6/2020 | Jacob ............... H05B 3/145 |
| 2021/0291992 A1* | 9/2021 | Jacob ............... G01P 5/165 |

OTHER PUBLICATIONS

European Search Report issued for European Application No. 20200540.1; Date of Filing Oct. 7, 2020; dated Mar. 23, 2021 (9 pages).

\* cited by examiner

AIR DATA PROBE INCLUDING SELF-REGULATING THIN FILM HEATER

CROSS-REFERENCE TO RELATED APPLICATIONS

This application claims the benefit of Indian Application No. 201911043806 filed Oct. 29, 2019, which is incorporated herein by reference in its entirety.

BACKGROUND

Exemplary embodiments pertain to the art of aircraft sensors such as air data probes, and more particularly to air data probes that include thin film heaters to prevent icing during cold weather conditions.

Air data probes, such as pitot tubes are mounted to exterior surfaces of an aircraft and are widely used to determine airspeed of the aircraft. Due to their location, the air data probes are subjected to extremely cold conditions, and are typically heated to prevent and/or remove ice accumulation one or in the air data probe. Heating elements, such as resistive heating elements or thin film heaters, for example, are typically implemented within the housing of the probe to prevent icing during freezing conditions.

BRIEF DESCRIPTION

According to a non-limiting embodiment, an air date probe comprises a strut assembly extending from a base, and a tube assembly coupled to the strut assembly. One or both of the strut assembly and the tube assembly comprises a self-regulating thin film heating arrangement. The self-regulating thin film heating arrangement comprises at least one circuit including a positive temperature coefficient (PTC) heating element connected in series with a negative temperature coefficient (NTC) heating element.

According to another non-limiting embodiment, a method is provided to control heating of a self-regulating thin film heating arrangement included in an air data probe. The method comprises delivering an electrical current to at least one self-regulating thin film heating arrangement including a positive temperature coefficient (PTC) heating element connected in series with a negative temperature coefficient (NTC) heating element, and dissipating power via the NTC heating element in response to flowing the current therethrough to generate heat. The method further comprises varying the heat emitted from the NTC heating element in response to varying a temperature surrounding the PTC heating element.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Air data probes have recently began implementing thin film heaters instead of conventional coil-based resistive heating elements because they provide improved reliable using less-complex designs. However, as the temperature surrounding the air data probe increases above freezing temperature, the inherent characteristic of a CNT heater causes its resistance to decrease which can cause excessive energy consumption and overheating.

One or more non-limiting embodiments described herein provides an air data probe that implements a thin film heater including a positive temperature coefficient (PTC) heating element in series connection with a negative coefficient temperature (NTC) heating element. In one or more non-limiting embodiment, the PTC heating element includes a carbon black and polymer composite heater, while the NTC heating element includes a carbon nanotube (CNT) and silicon composite heater (also referred to as a CNT heater).

CNT heaters exhibit NTC characteristics at low temperatures and can provide an improvement in energy consumption over conventional coil-based heating elements by about 20% to about 25%. PTC heaters exhibit PTC characteristics. For example, PTC heaters provide an electric resistance that increases with temperature and is also capable of self-regulating its temperature at a pre-defined higher temperature. Therefore, combining a PTC heating element in series with a CNT heater allows the CNT heater to efficiently heat the air data probe during freezing conditions, while the PTC heating element regulates the CNT heater as surrounding temperatures increase above freezing conditions.

Figure 1:
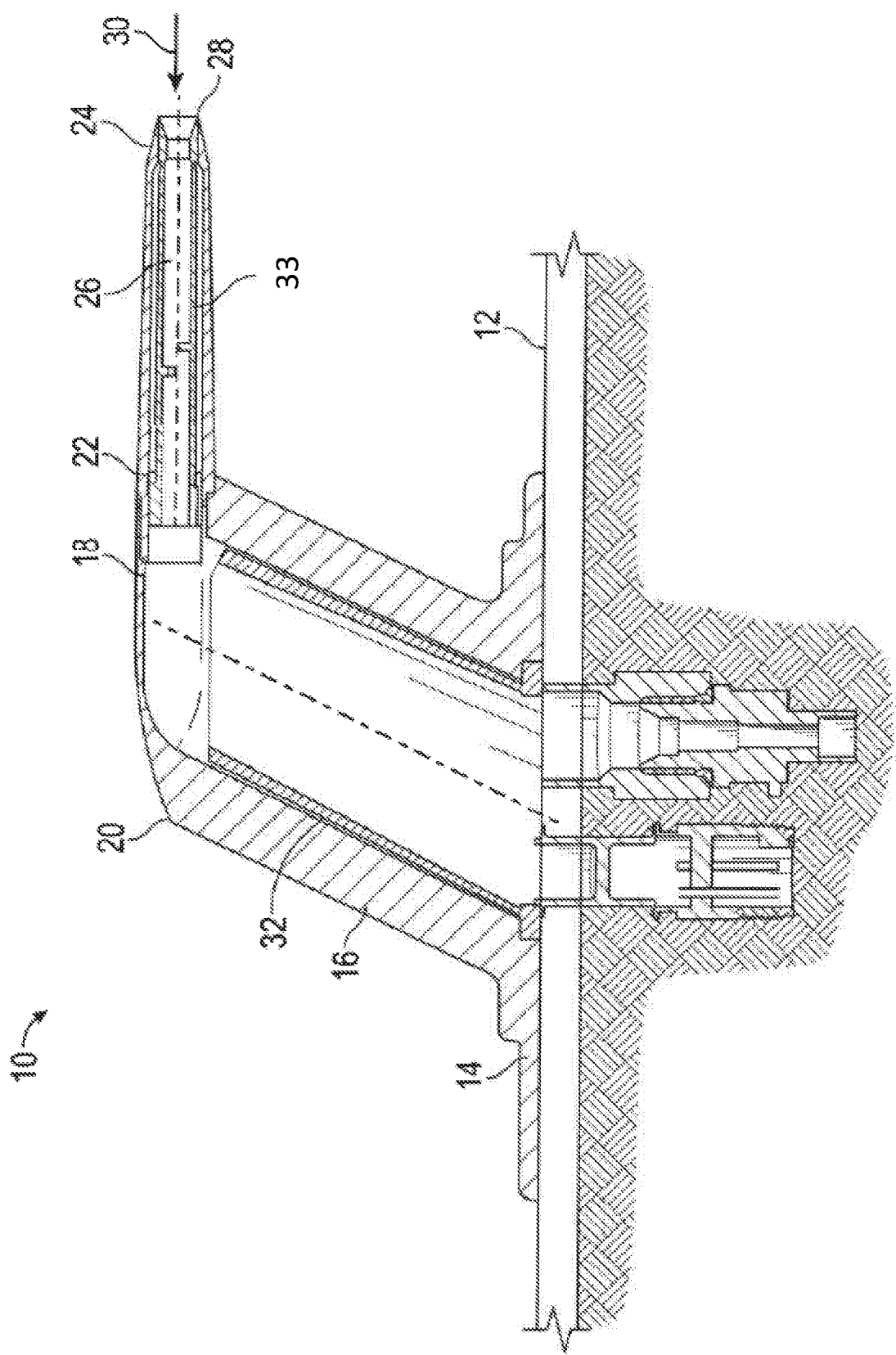
FIG. 1 is an illustration of an embodiment of an air data tube according to a non-limiting embodiment.

With reference now to FIG. 1, an air data probe 10 is illustrated according to a non-limiting embodiment. Although the air data probe 10 is constructed as a pitot tube 10, a variety of different air data probe designs may be implemented without deviating from the scope of the invention. The air data probe 10 is secured to an external surface 12 of an aircraft or other structure. The air data probe 10 includes a base 14 located at the external surface 12, and a strut assembly 16 extending from the base 14 to an upper strut portion 20. A tube assembly 18 is located at the upper strut portion 20. The tube assembly 18 includes a cylindrical body portion 22 and a tip portion 24 extending along a tube axis 26 from the body portion 22 to a tube inlet 28 which allows and airflow 30 to enter the tube assembly 18.

The air data probe 10 is configured to include one or more self-regulating thin film heating assemblies 32 and/or 33, which can be installed in the strut assembly 16 and/or the tube assembly 18. The self-regulating thin film heating assemblies 32 and/or 33 dissipate power when electrically energized so as to generate surface heating. The amount of power dissipated depends on the electric resistivity-temperature characteristics of the material employed in the self-regulating thin film heating arrangement 32 and/or 33, which in turn controls the temperature of the emitted heat.

Figure 2B:
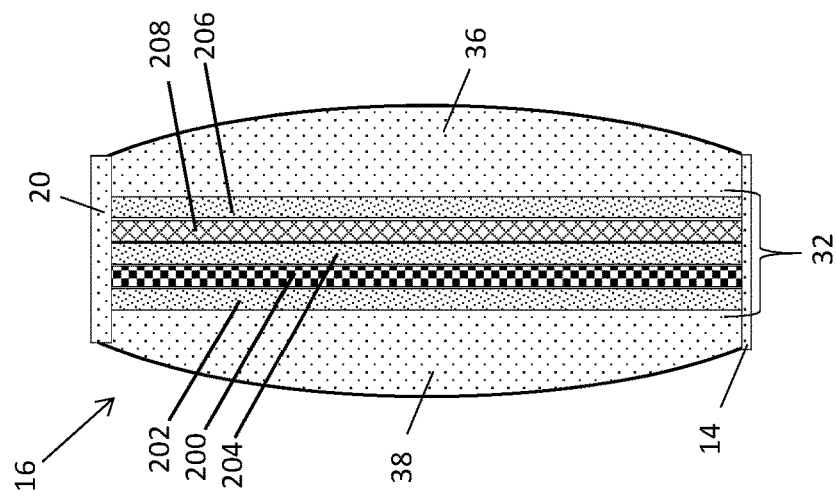
FIG. 2B illustrates a self-regulating thin film heating arrangement included in the strut assembly shown in FIG. 2A according to a non-limiting embodiment.
Figure 2A:
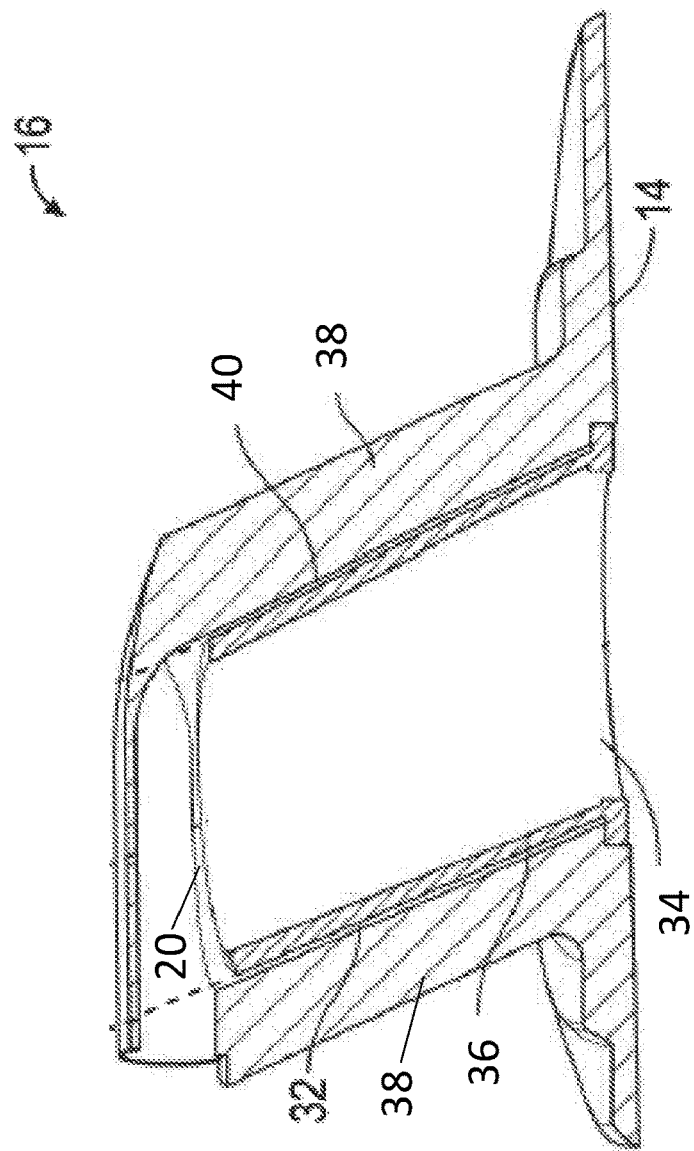
FIG. 2A is a cross-sectional view of a strut assembly of an air data probe according to a non-limiting embodiment.

Turning to FIGS. 2A and 2B, a strut assembly 16 configured to support a self-regulating thin film heating arrangement 32 is illustrated according to a non-limiting embodiment. The strut assembly 16 can include a primary frustum and a secondary frustum are formed from a metallic material, such as a nickel material. In some embodiments, the secondary frustum has a secondary frustum surface arranged at a secondary frustum angle relative to the central axis. The strut assembly 16 can further include a strut sleeve 34 extending from one end disposed on the base 14 to an opposing end disposed at an upper strut portion 20. The self-regulating thin film heating arrangement 32 can be installed or wrapped about the outer surface of the strut sleeve 34, and a strut housing 38 can be installed over the self-regulating thin film heating arrangement 32 and strut sleeve 34. The strut housing 38 is a hollow structure with a strut housing inner surface 40.

Turning to FIGS. 3A, 3B, and 3C and 3D, a tube assembly 18 configured to support a self-regulating thin film heating arrangement 33 is illustrated according to a non-limiting embodiment. The tube assembly 18 is constructed with a hollow tube sleeve 50 extending from a proximate end 52 coupled to the upper strut portion 20 to a distal end 53 that terminates the tube inlet 28. The tube sleeve 50 includes a sleeve outer surface 54 located opposite a sleeve inner surface 55, and has a sleeve frustum angle relative to a tube axis 58. The sleeve frustum angle is configured such that the sleeve outer surface 54 has a reducing radial distance from the tube axis 58 with reducing distance from the tube inlet 28. Further, in some embodiments, the sleeve outer surface 54 has a further tapered portion 60 at or near a throat 62 of the tube assembly 18. The tube sleeve 50 includes a cylindrical surface 63 at or near the tube inlet 28.

The self-regulating thin film heating arrangement 33 can be installed or wrapped about the sleeve outer surface 54, and a tube housing 64 can be installed over the self-regulating thin film heating arrangement 32 and tube sleeve 50. The tube housing 64 is a hollow, tubular structure with an inner housing surface 66. The sleeve cylindrical surface 63 allows for brazing of the tube sleeve 50 to the tube housing 64 during assembly without damaging the self-regulating thin film heating arrangement 33.

The self-regulating thin film heating arrangement 32 and/or 33 includes nano-composites of carbon allotropes. In one or more embodiments, the self-regulating thin film heating arrangement 32 and/or 33 includes a positive temperature coefficient (PTC) heating element connected in series with a negative temperature coefficient (NTC) heating element. The PTC heating element includes carbon black/polymer composites, while the NTC heating element includes a carbon nanotube/silicone nano-composite (CNT) heaters. Additionally, the self-regulating thin film heating arrangement 32 and/or 33 may include one or more insulation layers to prevent current leakage from and short circuit of the self-regulating thin film heating arrangement 32 and/or 33.

When implementing the self-regulating thin film heating arrangement 32 in the strut assembly 16, the PTC heating element (e.g., a carbon black/polymer composite heater) 200, one or more insulation layers 202, 204, 206, and the NTC heating element 208 (i.e., a carbon nanotube/silicone heater) can be stacked between the strut housing 38 and the strut sleeve 34. Referring to FIG. 2B, for example, each of the PTC heating element 200, the insulation layers 202, 204, 206, and the NTC heating element 208 extend from a first end that is disposed adjacent to the base 14 to a second end that is disposed opposite the first end and adjacent to the upper strut portion 20. One non-limiting embodiment provides the PTC heating element 200 between a first insulation layer 202 disposed against the strut housing 38 and a second insulation layer 204. The NTC heating element 208 is interposed between the second insulation layer 204 and a third insulation layer 206 disposed against the surface 36 of the strut sleeve 34. In some embodiments, the combined thickness of the self-regulating thin film heating arrangement 32 and the insulation layers 202, 204, 206 is on the order of 0.03". Further, end regions of the assembly can be sealed to prevent the self-regulating thin film heating arrangement 32 from being subjected to external corrosive elements. In one or more non-limiting embodiments, the PTC and CNT can include terminals (not shown) to establish electrical connections between one another. Although not illustrated, it should be appreciated that another non-limiting embodiment disposes the NTC heating element 208 between a first insulation layer 202 formed against the strut housing 38 and a second insulation layer 204, while the PTC heating element 200 is interposed between the second insulation layer 204 and a third insulation layer 206 disposed against the outer surface 36 of the strut sleeve 34.

Figure 3A:
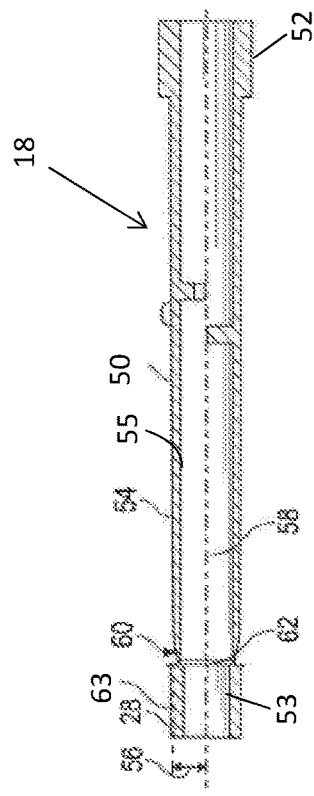
FIG. 3A is a cross-sectional view of an embodiment of a tube sleeve according to a non-limiting embodiment.
Figure 3B:
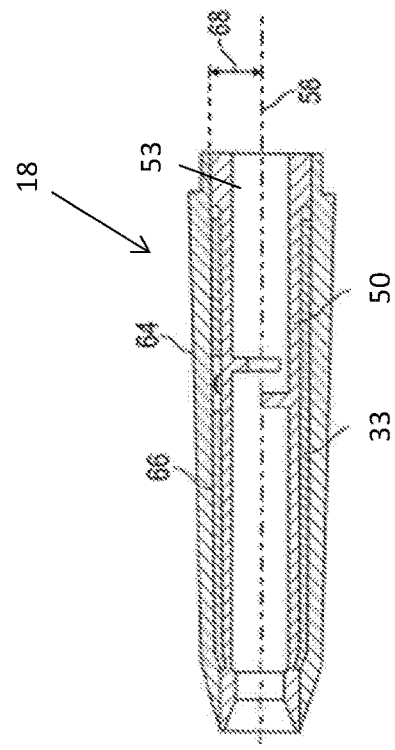
FIG. 3B is a cross-sectional view of a tube assembly of an air data probe according to a non-limiting embodiment.
Figure 3D:
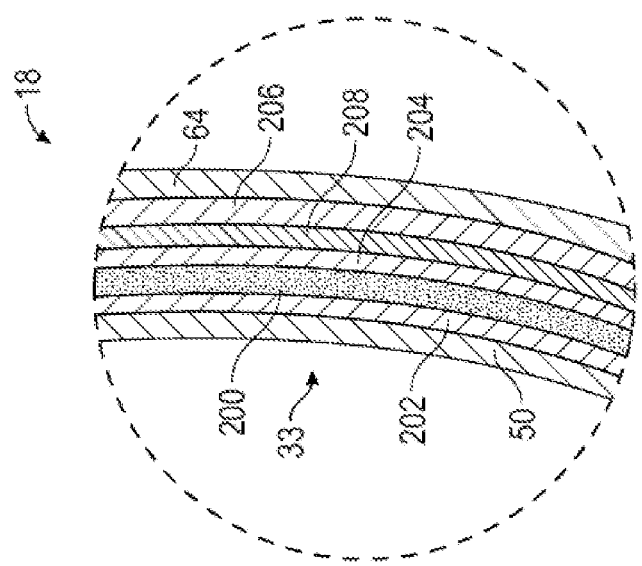
FIG. 3D illustrates a self-regulating thin film heating arrangement included in the tube sleeve shown in FIG. 3C according to a non-limiting embodiment.
Figure 3C:
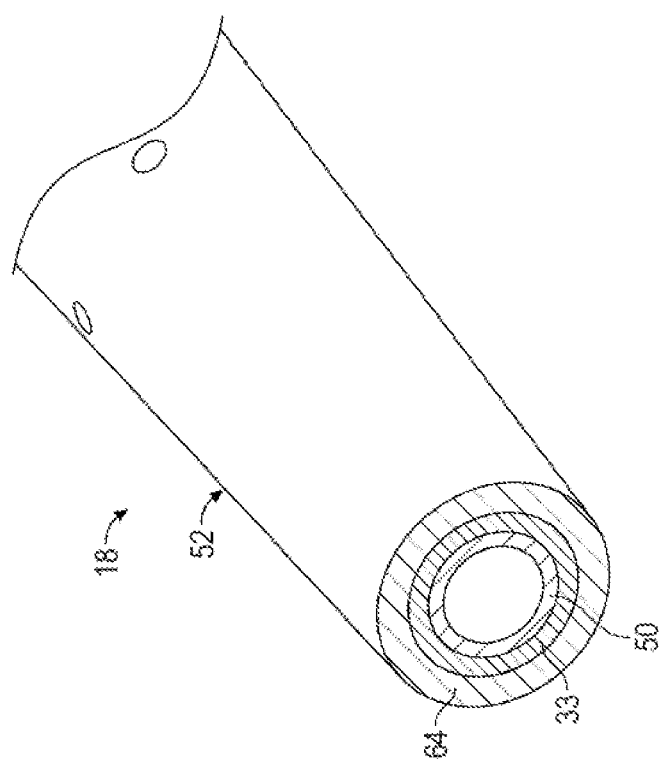
FIG. 3C is a perspective view of a tube sleeve including a self-regulating thin film heating arrangement according to a non-limiting embodiment.

When implementing the self-regulating thin film heating arrangement 33 in the tube assembly 18, the PTC heating element 200 (e.g., a carbon black/polymer composite heater), the insulation layers 202, 204, 206, and the NTC heating element 208 (e.g., a carbon nanotube/silicone heater) are cylindrically stacked between the inner sleeve and an inner surface of the cylindrical housing (see FIG. 3C). Referring to FIG. 3D, for example, one non-limiting embodiment provides the PTC heating element 200 between a first insulation layer 202 disposed against the tube sleeve 50 and a second insulation layer 204. The NTC heating element 208 is interposed between the second insulation layer 204 and a third insulation layer 206 disposed against the inner surface of the tube housing 64. In some embodiments, the combined thickness of the self-regulating thin film heating arrangement 33 and the insulation layers 202, 204, 206 is on the order of 0.03". Further, end regions of the assembly can be sealed to prevent the self-regulating thin film heating arrangement 33 from being subjected to external corrosive elements. In one or more non-limiting embodiments, the PTC and CNT can include terminals to establish electrical connections between one another. Although not illustrated, it should be appreciated that another non-limiting embodiment disposes the NTC heating element 208 between a first insulation layer 202 formed against the tube sleeve 50 and a second insulation layer 204, while the PTC heating element 200 is interposed between the second insulation layer 204 and a third insulation layer 206 disposed against the inner surface of the tube housing 64. The insulation layer 206 can be formed of various known dielectric materials. >

Figure 4:
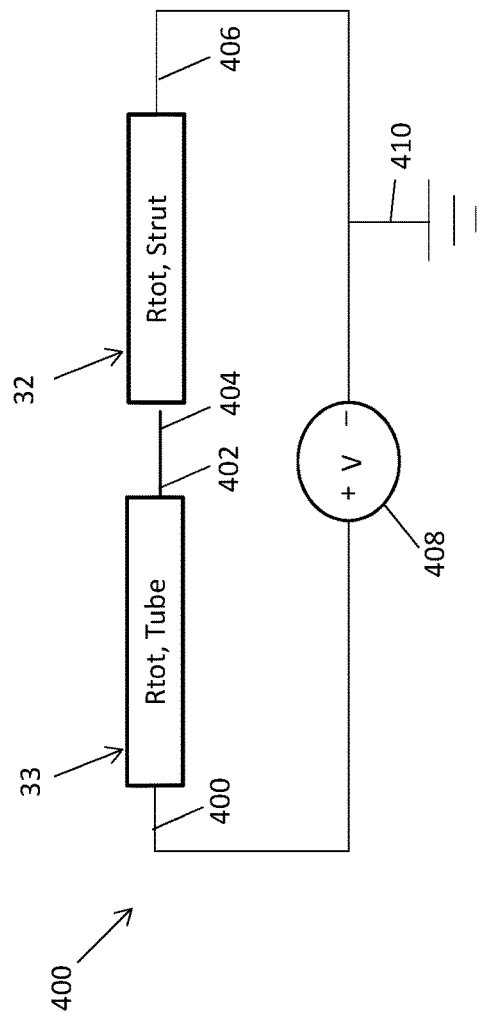
FIG. 4 is a circuit diagram of a self-regulating thin film heating arrangement included in a tube assembly connected in series with a self-regulating thin film heating arrangement included in a strut assembly according to a non-limiting embodiment.

Turning to FIG. 4, a circuit 400 of a self-regulating thin film heating arrangement 33 included in a tube assembly 18 connected in series with a self-regulating thin film heating arrangement 32 included in a strut assembly 16 is illustrated according to a non-limiting embodiment. The tube self-regulating thin film heating arrangement 33 includes a tube input node 400 and a tube output node 402. The strut self-regulating thin film heating arrangement includes a strut input node 404 and a strut output node 406.

In one or more non-limiting embodiments, the tube input node 400 is in signal communication with a voltage source 408 and the tube output node 402 is in signal communication with the strut input node 404. The strut output node 406 is in signal communication with a ground potential 410, thereby providing a series circuit 400 where the tube self-regulating thin film heating arrangement 33 is connected in series with the strut self-regulating thin film heating arrangement 32. It should be appreciated that in other embodiments, the strut input node 404 is in signal communication with a voltage source 408 and the strut output node 406 is in signal communication with the tube input node 400. The tube output node 402 can be in signal communication with a ground potential 410, thereby providing a series circuit 400 where the strut self-regulating thin film heating arrangement 32 is connected in series with the tube self-regulating thin film heating arrangement 33. In either case, the effective total resistance of the series circuit 400 is the sum of the total resistance of the tube self-regulating thin film heating arrangement 33 (Rtot, tube) and the total resistance of the strut self-regulating thin film heating arrangement 32 (Rtot, strut), i.e., Rtot, pitot=(Rtot, tube)+(Rtot, strut).

Figure 5:
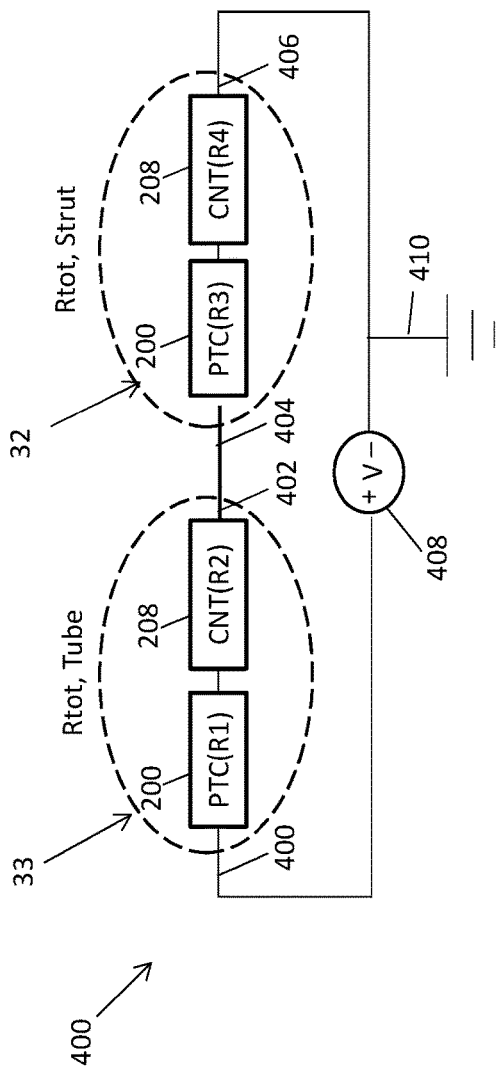
FIG. 5 is a circuit diagram of a self-regulating thin film heating arrangement included in a tube assembly and a self-regulating thin film heating arrangement included in a strut assembly according to a non-limiting embodiment.

Referring to FIG. 5, a circuit 400 of a self-regulating thin film heating arrangement 33 included in a tube assembly 18 and a self-regulating thin film heating arrangement 32 included in a strut assembly 16 is illustrated according to a non-limiting embodiment. The total effective resistance of the tube self-regulating thin film heating arrangement 33 and/or the strut self-regulating thin film heating arrangement 32 is shown as the sum of the resistance of the PTC heating element 200 (e.g. PTC heater 200) and the resistance of the NTC heating element 208 (e.g., a CNT heater 208) i.e., Rtotal=PTC(Rn)+CNT(Rn).

The resistance variations according to temperatures of the PTC heater 200 and/or the CNT heater 208 can be tailor-made or designed per application to match targeted power dissipation profiles and maximum targeted temperatures or target temperature thresholds. The total effective resistance of the PTC heater 200 and the CNT heater 208 (i.e., PTC(Rn)+CNT(Rn)) is designed such that effective series circuit resistance (R1+R2) is made less than or equal to the existing resistance wire heater at lower temperatures. For each of the heater units (i.e., the PTC heater 200 and the CNT heater 208) installed in the tube assembly 18 and the strut assembly 18, the PTC heater 200 has different electrical resistivity characteristics (compared to the CNT electrical characteristics), which can be customized to achieve a targeted maximum temperature or temperature threshold that will output a targeted maximum current output to the CNT heater 208. Referring to the tube self-regulating thin film heating arrangement 33, for example, the effective resistance of the PTC heater 200 connected in series with the CNT heater 208 is less than a conventional wire heater resistance at lower temperature and will increase to a higher targeted maximum temperature based on the design of the PTC heater 200.

At higher temperatures, the PTC heater 200 increases its resistance exponentially until the targeted temperature threshold is reached. In turn, the current level of the current output to the CNT heater 208 is reduced, thereby reducing the power dissipation by the CNT heater 208. In this manner, the PTC heater 200 is capable of self-regulating the temperature of the thin film heating arrangement to avoid overheating and excessive power consumption. Connecting the PTC heater 200 in series with the CNT heater 208 also facilitates uniform heating, thereby avoiding concentrated hot spots on the surfaces of the tube assembly 18 and/or strut assembly 16.

Figure 6:
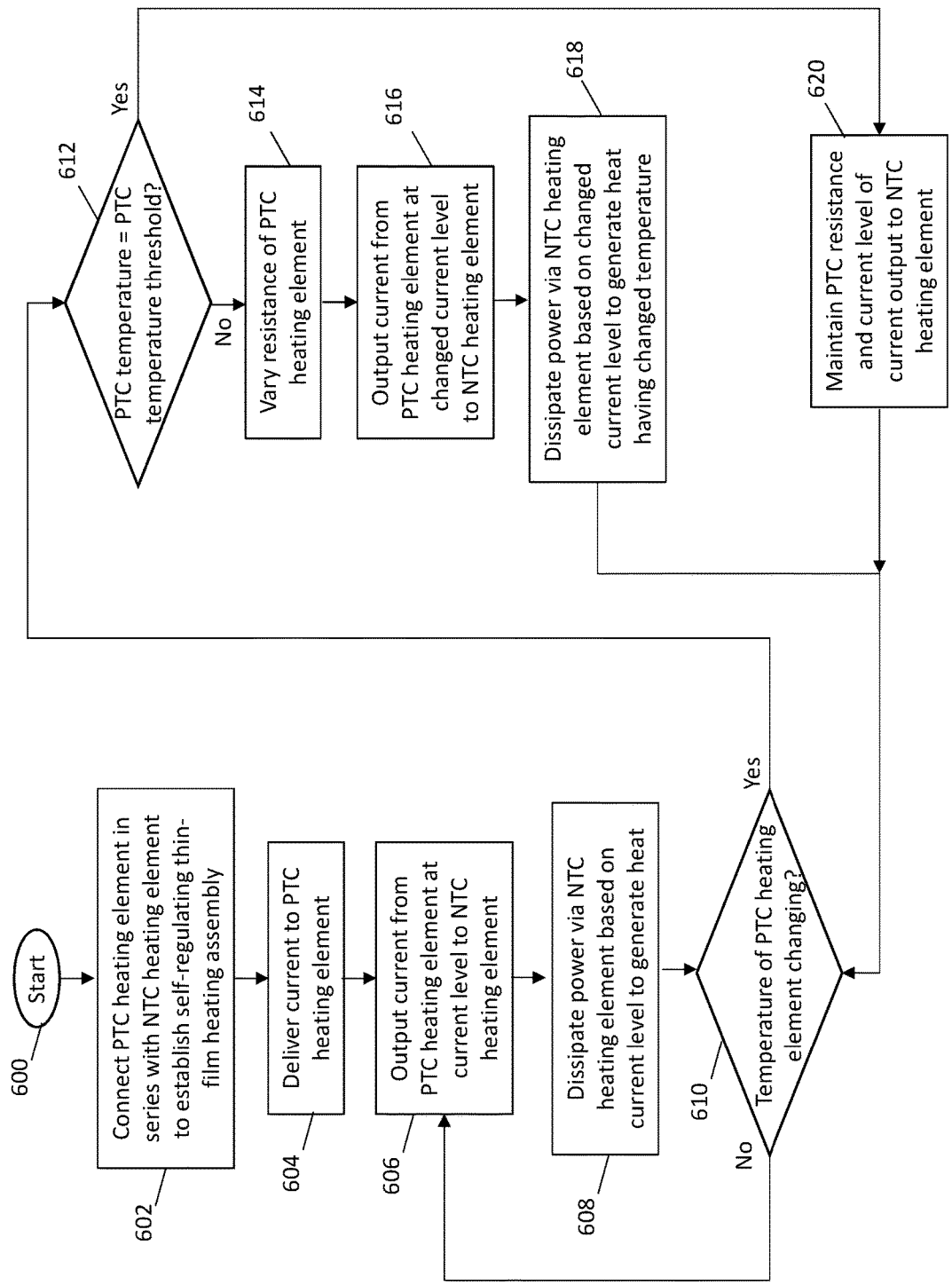
FIG. 6 is a flow diagram illustrating a method of controlling a self-regulating thin film heating arrangement included in an air data probe according to a non-limiting embodiment.

With reference to FIG. 6, a method of controlling a self-regulating thin film heating arrangement included in an air data probe is illustrated according to a non-limiting embodiment. The method begins at operation 600, and at operation 602 a PTC heating element (e.g., a PTC heater) is connected in series with an NTC heating element (e.g., a CNT heater) to establish a self-regulating thin film heating arrangement. At operation 604, current is delivered to the PTC heating element and the PTC heating element outputs current having a current level to the NTC heating element at operation 606. At operation 608, the NTC heating element dissipates power based on the current output from the PTC heating element. The power is dissipated in the form of heat, which heats the air data probe. The temperature of the heat is based on the level of the current output from the PTC heating element.

At operation 610, a determination is made as to whether the temperature of the PTC heating element changes. For example, changes in the temperatures surrounding the air data probe can change the temperature of the PTC heating element. When the temperature remains constant or substantially constant, the method returns to operation 606 and continues outputting the current at the current level. When the temperature changes, however, operation 612 determines whether the PTC heating element has reached a targeted temperature threshold (e.g., a maximum pre-set temperature).

When the PTC heating element has not reached the temperature threshold, the resistance of the PTC heating element changes at operation 614. For example, the resistance of the PTC heating element changes as the temperature of the PTC heating element decreases, while the resistance of the PTC heating element increases as the temperature of the PTC heating element increases. The varying resistance in response to the change in temperature is an inherent characteristic of a carbon black/polymer composite heater, which can be used to form the PTC heating element. At operation 616, the current level of the current output from the PTC heating element is changed based on the temperature change of the PTC heating element. For example, when the temperature of the PTC heating element increases at operation 614, the resistance of the PTC heating element increases thereby decreasing the current output to the NTC heating element. At operation 618, the NTC heating element dissipates the power based on the changed current level (e.g., the decreased current) output from the PTC heating element. Accordingly, the temperature of the heat emitted by the NTC heating element changes (e.g., decreases), and the method returns to operation 610 to determine if the temperature of the PTC heating element has changed.

When, however, the temperature of the PTC heating element has reached the temperature threshold at operation 612, the resistance of the PTC heating element is maintained, or substantially maintained, and the current level of the current output to the NTC heating element is also maintained, or substantially maintained at operation 620. Accordingly, the temperature of the heat emitted by the NTC heating element is maintained, or substantially maintained, and the method returns to operation to determine if the temperature of the PTC heating element has changed.

The air data probe configurations disclosed herein provide enhanced safety and service life by preventing heater failure and excessive power consumption. Further, the heating profile of the air data probe may be customized to meet requirements by, for example, modifying the electrical characteristics of the self-regulating thin film heating arrangement (e.g., the PTC heating element and/or the NTC heating element) without changing an external design of the air data probe.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air data probe, comprising:
    a strut assembly extending from a base;
    a tube assembly coupled to the strut assembly and extending therefrom; and
    a self-regulating thin film heating arrangement in operable communication one or both of the strut assembly and the tube assembly, the self-regulating thin film heating arrangement comprising at least one circuit including a positive temperature coefficient (PTC) heating element having a first resistance connected in series with a negative temperature coefficient (NTC) heating element having a second resistance, a sum of the first and second resistances defining a total resistance of the self-regulating thin film heating arrangement,
    wherein the first resistance corresponds to a targeted temperature threshold of the PTC heating element, and wherein the PTC heating element outputs a targeted maximum current that is set by the first resistance, and
    wherein the NTC heating element dissipates a targeted amount of power according to the targeted maximum current.

2. The air data probe of claim 1, wherein the strut assembly includes a strut self-regulating thin film heating arrangement and the tube assembly includes a tube self-regulating thin film heating arrangement connected in series with the strut self-regulating thin film heating arrangement.

3. The air data probe of claim 2, wherein the tube self-regulating thin film heating arrangement includes a tube input node and a tube output node, and the strut self-regulating thin film heating arrangement includes a strut input node and a strut output node.

4. The air data probe of claim 3, wherein the tube input node is in signal communication with a voltage source and the tube output node is in signal communication with the strut input node, and wherein the strut output node is in signal communication with a ground potential.

5. The air data probe of claim 4, wherein the tube self-regulating thin film heating arrangement and the strut self-regulating thin film heating arrangement each include a carbon black/polymer composite heater forming the PTC heating element connected in series with a carbon nanotube/silicone heater forming the NTC heating element.

6. The air data probe of claim 5, wherein at least one insulation layer is interposed between the carbon black/polymer composite heater and the carbon nanotube/silicone heater.

7. The air data probe of claim 6, wherein the tube assembly comprises a cylindrical housing extending about a tube axis and an inner sleeve disposed within the cylindrical housing.

8. The air data probe of claim 7, wherein the carbon black/polymer composite heater, the at least one insulation layer, and the carbon nanotube/silicone heater are cylindrically stacked between the inner sleeve and an inner surface of the cylindrical housing.

9. The air data probe of claim 6, wherein the strut assembly comprises a strut housing and a strut sleeve disposed in the strut housing, the strut sleeve extending from the base to an upper strut portion located opposite the base.

10. The air data probe of claim 9, wherein the carbon black/polymer composite heater, the at least one insulation layer, and the carbon nanotube/silicone heater are stacked between the strut housing and the strut sleeve.

11. The air data probe of claim 10, wherein the carbon black/polymer composite heater, the at least one insulation layer, and the carbon nanotube/silicone heater extend from a first end disposed adjacent to the base and a second end disposed opposite the first end and adjacent to the upper strut portion.

12. A method of controlling heating of a self-regulating thin film heating arrangement included in an air data probe, the method comprising:
    determining a targeted amount of power to be dissipated from the self-regulating thin film heating arrangement;
    determining a targeted maximum current that achieves the targeted amount of power to be dissipated;
    delivering an electrical current to at least one self-regulating thin film heating arrangement including a positive temperature coefficient (PTC) heating element having a first resistance connected in series with a negative temperature coefficient (NTC) heating element having a second resistance, a sum of the first and second resistances defining a total resistance of the self-regulating thin film heating arrangement;
    outputting the targeted maximum current from the PTC heating element to the NTC heating element;
    dissipating the targeted amount of power via the NTC heating element in response to flowing the targeted maximum current therethrough to generate heat; and varying the heat emitted from the NTC heating element in response to varying a temperature surrounding the PTC heating element.

13. The method of claim 12, further comprising varying a resistance of the PTC heating element in response to varying the temperature surrounding the PTC heating element.

14. The method of claim 13, wherein varying the resistance includes decreasing the resistance as the surrounding temperature decreases and increasing the resistance as the surrounding temperature increases.

15. The method of claim 14, wherein the PTC heating element outputs the current to the NTC heating element at a first current level while operating at a first surrounding temperature, and outputs the current to the NTC heating element at a second current level while operating a second surrounding temperature different than the first surrounding temperature.

16. The method of claim 15, wherein the second current level is less than the first current level, and wherein the second temperature is greater than the first temperature.

17. The method of claim 14, wherein the NTC heating element emits heat having a first temperature in response to receiving the current having the first current, and emits the heat having a second temperature in response to receiving the current having the second current level.

18. The method of claim 17, wherein the second temperature is less than the first temperature.

19. The method of claim 12, wherein the PTC heating element is a carbon black/polymer composite heater and wherein the NTC heating element is a carbon nanotube/silicone heater.

20. The method of claim 12, wherein a tube self-regulating thin film heating arrangement is disposed in a tube assembly, wherein a strut self-regulating thin film heating arrangement is disposed in a strut assembly of the air data probe, and wherein the strut assembly is in thermal communication with the tube assembly.

* * * * *